US005512996A

United States Patent [19]

Faré

[11] Patent Number: 5,512,996

[45] Date of Patent: Apr. 30, 1996

[54] ELECTROPHOTOGRAPHIC APPARATUS INCORPORATING OFFSET STACKING

[75] Inventor: Carlo Faré, Milano, Italy

[73] Assignee: Bull HN Information Systems Italia S.p.A., Torino, Italy

[21] Appl. No.: 271,157

[22] Filed: Jul. 6, 1994

[30] Foreign Application Priority Data

Jul. 15, 1993 [EP] European Pat. Off. .............. 93830303

[51] Int. Cl.[6] .................................................... G03B 15/00

[52] U.S. Cl. ............................ 355/322; 211/50; 271/184; 271/207; 414/791.2

[58] Field of Search .................................... 355/321, 322, 355/323; 271/207, 184, 185, 298, 302, 272, 314; 414/791.2; 211/50

[56] References Cited

U.S. PATENT DOCUMENTS 4,188,025 2/1980 Gusfafson et al. ..................... 271/314

4,861,213 8/1989 Fuchs .................................. 414/791.2

FOREIGN PATENT DOCUMENTS

0357055A2 3/1990 European Pat. Off. .

61-256361 11/1986 Japan .................................... 355/322

*Primary Examiner*—Joan H. Pendegrass

*Attorney, Agent, or Firm*—Sheridan Ross & McIntosh

[57] ABSTRACT

An electrophotographic apparatus incorporating a sorter device formed by a double pair of driving rollers for ejecting sheets from the apparatus and delivering them into a collecting bin, the two roller pairs acting on the side edges of the sheets at selectively controllable velocities to selectively produce an angular deflection of the outgoing sheets in either of two directions and their delivery into the collecting bin in different positions rotated from each other, the bin having an opening dihedral with side walls which define the maximum amounts of imparted deflection for the two positions.

17 Claims, 4 Drawing Sheets

ELECTROPHOTOGRAPHIC APPARATUS INCORPORATING OFFSET STACKING

BACKGROUND OF THE INVENTION

This invention relates to an electrophotographic apparatus incorporating a sorter device.

DESCRIPTION OF THE PRIOR ART

It is well known that electrophotographic apparatus, more commonly referred to as copiers, are customarily equipped with a sorter device enabling a plurality of copies to be orderly laid into a plurality of collecting bins in stacked arrangements.

Such sorter devices are bulky, expensive, and unsuitable for combination with compact electrophotographic equipment of the office type, usually intended for installation on a desk.

Such compact equipment includes both copiers and printers, usually laser printers, employed as printout units for small data processing systems, working stations, and personal computers.

A current trend with the latter favors shared use of one printing unit as a peripheral unit by a number of users, although this may be a limited number (2 or 3).

Thus, there exists a need for splitting multiple copies of one printed document, as well as for keeping printed sheets of one user separated from another user's.

To that aim, electrophotographic apparatus have been introduced on the market which are equipped with a sorter device of a so-called job offset type having a single collecting bin adapted to be shifted perpendicularly to the printed sheet direction of delivery from the apparatus, through a travel distance of a few centimeters between two discrete end positions.

Depending on the printing process selected by the user, the bin is shifted automatically to either position such that the printed sheets will gather at two discrete end locations in the bin by their process, hence their user, and can be readily separated even where the processes are interlaced and the printed sheets come interleaved.

Such job offset devices, which may also be used for severing duplicates, are bulky and expensive because they require a mechanical drive and a suitable holding frame for the bin, characterized of necessity by an amount of inertia.

To the mass of the moving bin to be driven, there adds the mass of the sheets discharged thereinto, which may attain significant levels if an operator will not remove the printed sheets at frequent intervals.

SUMMARY OF THE INVENTION

This problem is obviated by the electrophotographic apparatus with job offset sorter device of this invention, wherein no moving bin is used and sorting is performed by imparting, to the printed sheets being discharged from the apparatus, a rotation in the plane of the sheet to bring different sheets to at least two different angular positions whereby they can be readily separated.

According to the invention, this rotation is provided by an entrainment device for the paper sheets exiting the electrography apparatus which includes two nipping-action driving rollers arranged to act proximate to the two side edges of the outgoing sheets and driven to impart two different forward speeds to the two side edges, said speeds being set by a control signal.

According to a first aspect of this invention, one of the two driving rollers is driven mechanically at a fixed drive ratio from the motive means used for feeding the sheets through the apparatus, specifically through the fixing or fusing station thereof, and the drive ratio is selected such that the sheet edge will be imparted a higher forward speed than through the fixing station.

The other of the rollers is driven such that it will impart to the sheet edge either the same speed as through the fixing station, or a higher speed than that imparted by said one roller.

According to a further aspect of this invention, to prevent fused toner from becoming scratched due to sheet slip at the driving roller pair, and the print quality from being deteriorated (as may occur with printers featuring duplex capability, i.e. capable of printing on both sides of the sheet), one of the rollers is constantly driven to impart a forward speed equal to that imparted through the fixing station, and the other roller movement is timed to impart, to the sheet edge, the same speed as, or a higher or lower speed than, that imparted through the fixing station, an equal speed being imparted to the sheet edge while the sheet is held in the fixing station.

BRIEF DESCRIPTION OF THE DRAWINGS

The features and advantages of this invention will become apparent from the following description and the accompanying drawings, in which.

DESCRIPTION OF THE PREFERRED EMBODIMENT

Figure 1:
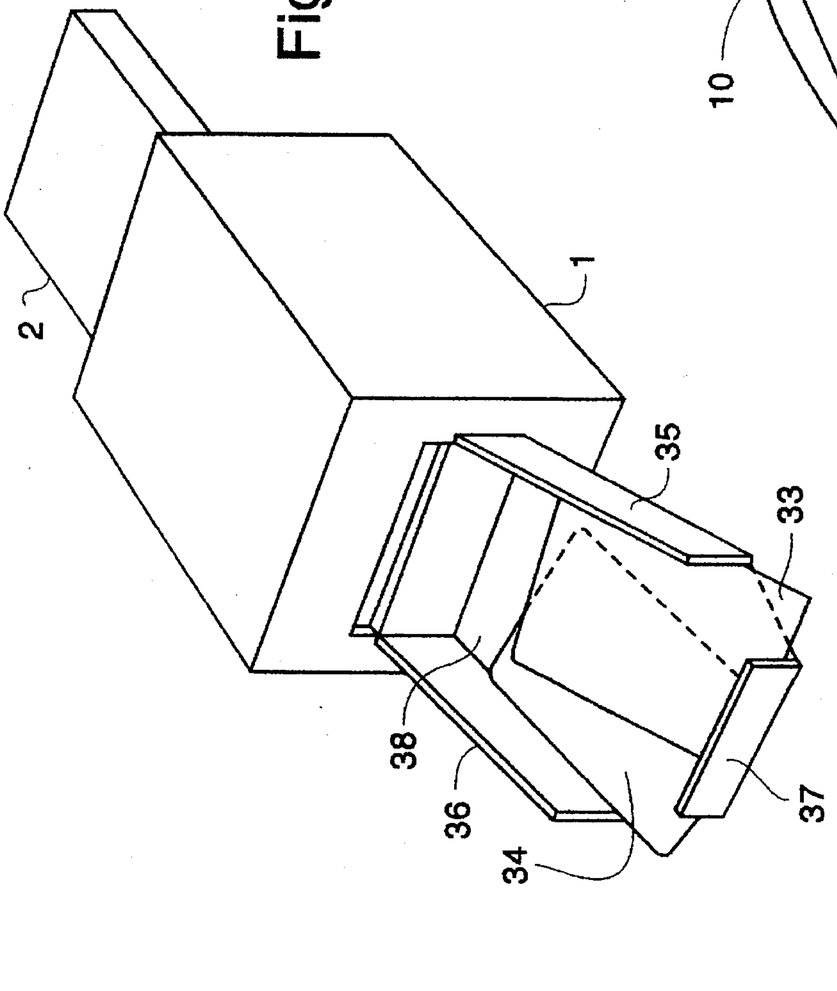
FIG. 1 is a perspective view of an electrophotographic apparatus incorporating a sorter device according to this invention.

With reference to FIG. 1, the apparatus forming the subject matter of this invention is an electrophotographic printer and comprises a body 1 having a generally parallelepipedic shape and accommodating the mechanical, electromechanical, and electronic control means of the apparatus.

In the instance of a copier, a sliding cover for scanning a document to be copied would be mounted on top of the body 1.

The sheets of paper or another material (e.g. a transparent plastics material), hereinafter referred to as print carriers, are stacked in a feed bin 2 placed on one side of the body 1, ready to be picked up from the bin one at a time and introduced into the body 1, printed, and discharged into a collecting bin 3 placed on the other side of the body 1.

Figure 2:
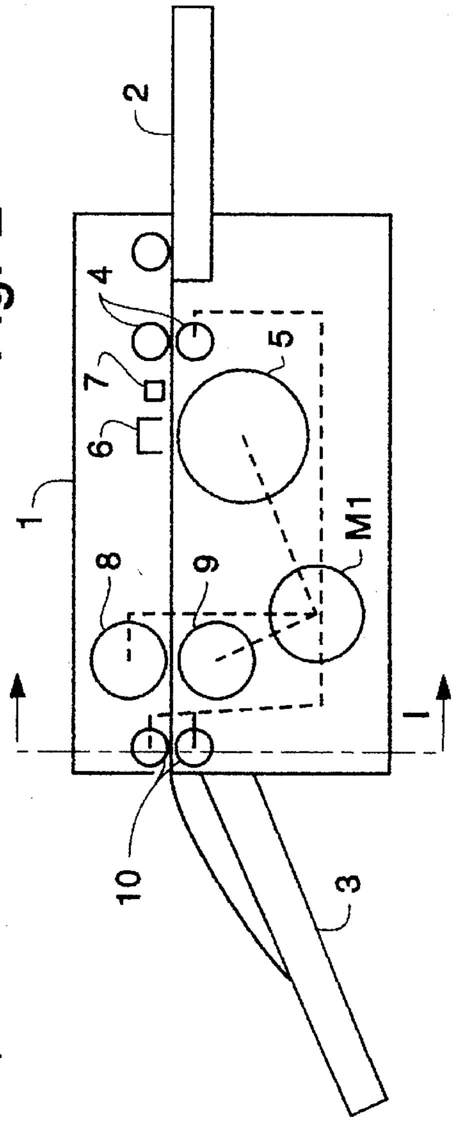
FIG. 2 is a schematic vertical section view through the apparatus in FIG. 1.

FIG. 2 shows schematically a cross-section through the apparatus of FIG. 1 to bring out its internal structure and the path travelled by the print carriers.

The print carriers are successively picked up from the bin 2 and inserted between a pair of driving rollers which will move them to a transfer station which comprises a drum 5 having a photoconductive surface and being juxtaposed to an electrostatic discharger 6.

On the drum 5 there is formed, in a known manner, a toner image which is then transferred, by the action of the electrostatic discharger 6, onto the print carrier as the latter is passed between the drum 5 and the electrostatic discharger 6.

The drum 5 and rollers 4 are rotated in a coordinated fashion by a motive means M1 which ensures equal peripheral velocity for the drum 5 and forward speed of the print carrier along a travel path indicated by a line P1.

Arranged in the travel path are sensors such as 7, which are effective to locate in space and time the leading and trailing edges of a print carrier.

Further along the path P1, the print carrier is conveyed through a fixing station consisting of two juxtaposed pressure rolls 8, 9, at least one of which is heated, effective to squeeze the toner onto the carrier and fusing it cause it to stick to the carrier.

In FIG. 2, the image is fixed on the lower side of the carrier, but of course, the layout of the components 5, 6 could be reversed and the image formed on the upper side, as is customary with copiers.

The two rolls 8, 9, driven in a coordinated fashion from the motive means M1, also act as driving rollers for the print carrier.

Further along the path P1, the print carrier goes through a delivery station which comprises a pair of friction rollers 10, 11 operative to discharge the print carrier into the collecting bin 3.

The rollers 10, 11, which are typically located a few centimeters downstream from the fixing station, in conventional printers and copiers, are driven from the motive means M1 in a coordinated fashion with the forward speed of the print carrier, that is, substantially at the same peripheral velocity.

Figure 3:
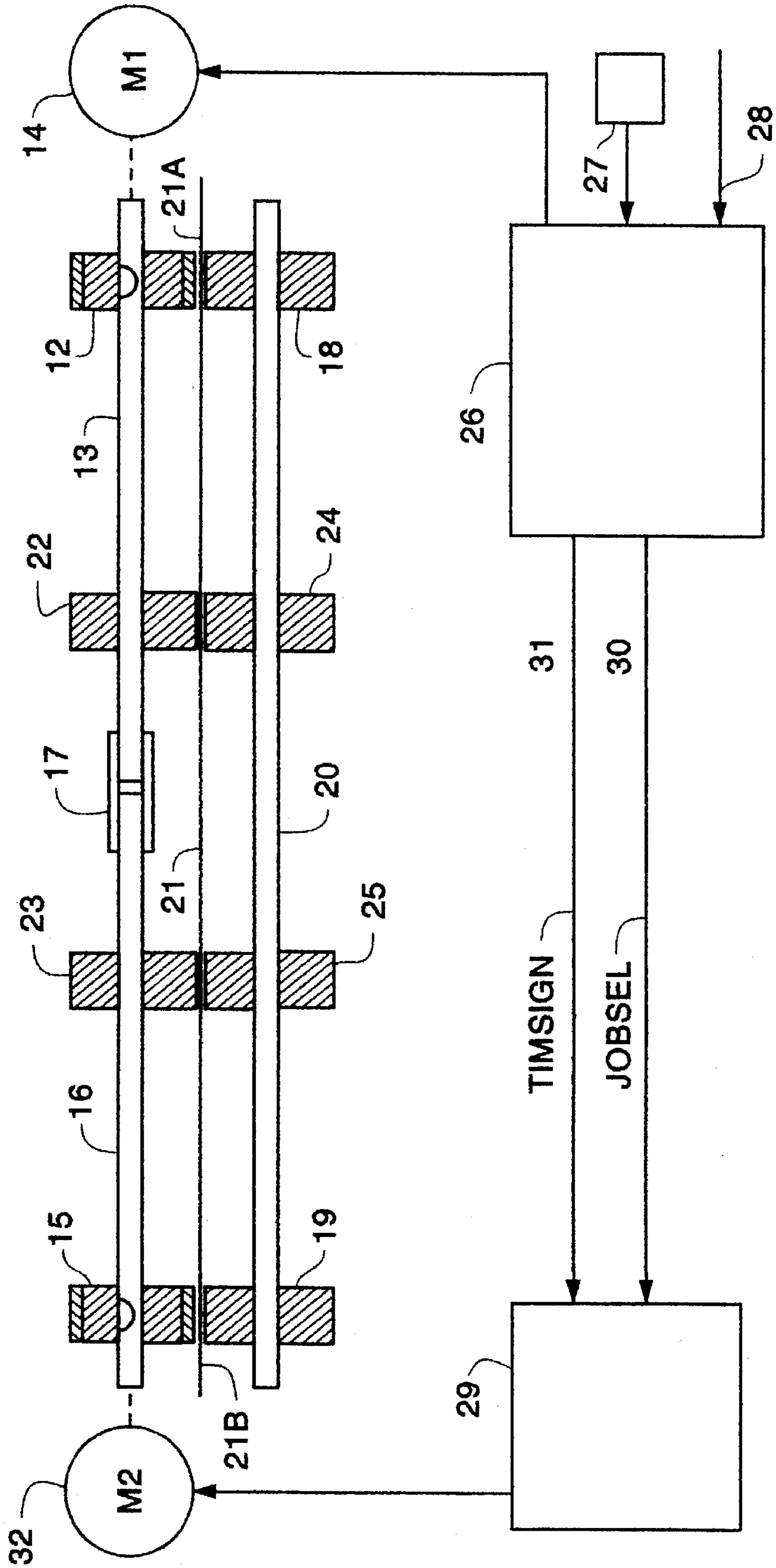
FIG. 3 shows a sectional view, taken along line I—I in FIG. 2, through the inventive apparatus and a diagramatic view of its control circuitry.

According to the invention, the roller pair 10, 11 comprise, to form a sorter device, two independently driven pairs, as shown schematically in FIG. 3 which may be regarded, as far as the driving rollers are concerned, as a sectional view taken along line I—I in FIG. 2.

The sorter device of FIG. 3 includes a first roller 12 keyed to a stub shaft 13 and driven by a motive means 14, a second roller 15 keyed to a stub shaft 16 aligned to the stub shaft 13 and coupled thereto by a sleeve 17 which allows for relative rotational movement of the two stub shafts.

A pair of free rollers 18, 19 fitted over an axle 20 are juxtaposed to the rollers 12, 15, respectively, to form two pairs of nip rollers, wherebetween the print carrier 21 is passed at two side regions or bands 21A, 21B.

Mounted on the stub shafts 13, 16 and the axle 20 for free rotation are additional rollers 22, 23, 24, 25 which basically serve guiding and supporting functions for the print carrier 21.

The roller pairs 12, 18 and 15, 19 provide two pairs of friction driving rollers for the print carrier which act on two side bands thereof interposed between the two pairs.

The stub shafts 13, 16 and the axle 20 are supported on the frame, not shown, of the electrophotographic apparatus.

A system control unit, consisting essentially of a processor 26, controls the energization of the motive means 14 to ensure a constant forward speed for the print carrier.

In addition, it controls and times the various printing operations according to process information 28 from a central processing unit and to signals from at least one sensor 27 which detects the movement of a leading edge and a trailing edge of the print carrier past predetermined locations in the path P1.

It also supplies a job selection signal JOB SEL and a timing signal TIM SIGN over wires 30, 31 to a control circuitry 29 for motive means 32 (M2) coupled to the stub shaft 16.

The motive means 32 may comprise a DC electric motor, or a step motor, or an electromagnetic brake as explained hereinafter.

By suitably controlling the motive means 32 to change the speed of the roller 15 relative to the roller 12 speed, a desired job sorting can be obtained whose outcome is illustrated by FIG. 1.

When the peripheral velocity of the roller 15 exceeds that of the roller 12, the print carrier 21, so long as held in the nip of the fixing station rollers 8 and 9, will leave the apparatus along a direction perpendicular to the plane containing the axes of the rolls 8, 9 or the rollers 12, 15, 18, 19 at a speed equal to the peripheral velocities of the rolls 8, 9 whose nipping action overcomes the driving action of the rollers 12 and 15.

After the print carrier is released from the fixing station, its forward motion comes from the rollers 12 and 15.

Thus, if the roller 15 was driven at a higher peripheral velocity than the roller 12, the print carrier would be rotated rightward and discharged into the collecting bin 3 at the location denoted by the reference numeral 33.

If the roller 15 was driven at a lower peripheral velocity than the roller 12, then the print carrier would be rotated leftward and discharged into the collecting bin 3 at the location denoted by the reference numeral 34.

For proper positioning of the print carrier into the bin 3, the bin is provided with first 35 and second 38 side walls against which the print carrier will abut under the thrust from the rollers 12, 15.

An end wall 37 prevents the print carriers from dropping off the bin by closing the remote bin end from the apparatus 1.

The side walls 25, 36 jointly form a dihedral opening toward the end wall.

Expediently, the side walls 35, 36 are unconnected to the end wall 37, and have cutouts for convenience in grasping the print carriers by one corner.

For the same reason, the bin bottom 38 is also provided with corresponding corner cutouts.

The rollers 12 and 15 may be controlled in any of several modes, as illustrated by the timing diagrams in FIGS. 4, 5, 6 and 7.

Figure 4:
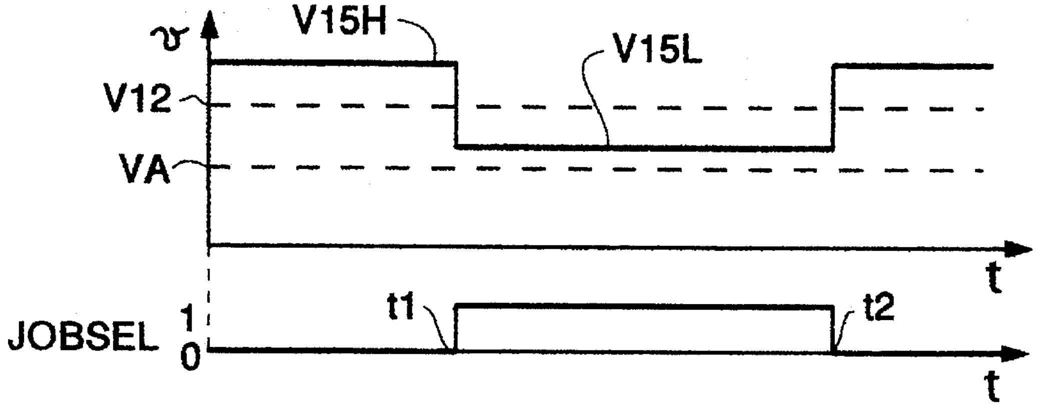
FIG. 4 is a timing diagram for a first operation mode of the sorter device.

FIG. 4 represents a control mode whereby the peripheral velocity of the roller 15 is controlled through a single job selection signal JOB SEL.

The roller 12 is controlled for a higher peripheral velocity V12 than the forward speed VA of the print carrier along its travel path.

The roller 15 is controlled for a peripheral velocity which is respectively higher (V15H) or lower (V15L) than V12, and in any event not lower than VA.

The change from V15H over to V15L is controlled through the signal JOB SEL.

With JOB SEL deasserted, the roller 15 velocity may be equal to V15H, for example, and equal to V15L with JOB SEL asserted.

Thus, so long as JOB SEL is asserted, print carriers following one another are rotated rightward.

If, at a time T1, JOB SEL is asserted, the print carriers exiting the apparatus are rotated leftward.

The switching of the signal JOB SEL may occur any time, and the only timing restriction would be that the change does not occur with a trailing edge of a print carrier released from the fixing station still in the nip between the entrainment roller pairs 12, 18 and 15, 19.

In order to avoid formation of a build-up wave in the path while the sheet is normally run between the fixing station and the delivery rollers 12, 15, the roller 15 velocity should not be slower than the forward speed VA.

Since in general the roller entrainment speed is higher than VA, while the print carrier forward speed is controlled by the fixing station, relative slip occurs between the print carrier and the surfaces of the rollers 12, 15.

To prevent abrasion of the toner fixed on the print carrier, the rollers 12, 15 should advisably act on the toner-free side of the carrier.

This problem does not exist on the side contacting the rollers 18 and 19 which are idle-mounted and hence entrained by the carrier.

Figure 5:
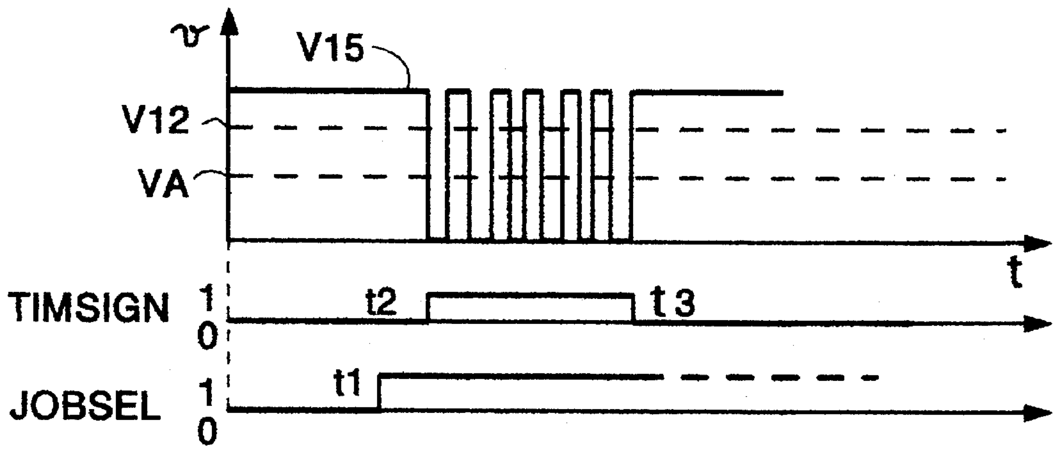
FIG. 5 is a timing diagram for a second operation mode of the sorter device.

With reference to FIG. 5, the motive means 32 may be replaced with a friction clutch between the shafts 13 and 16 and an electromagnetic brake acting on shaft 16.

In this case, the increased peripheral velocity of the roller 15 with respect to the roller 12 may be obtained by designing the roller 15 with a larger diameter than the roller 12.

A lower average peripheral velocity of the roller 15 than the roller 12 is obtained by intermittently energizing the electromagnetic brake.

The brake actuation should be confined to within a time interval T2–T3, when the print carrier would be released from the fixing station and still held between the delivery rollers.

The time interval T2–T3 is suitably defined through a signal TIM SIGN supplied from the processor 26 to the control circuitry 29 according to positional information about the print carrier received from the sensor Z7 or other equivalent sensors.

Figure 6:
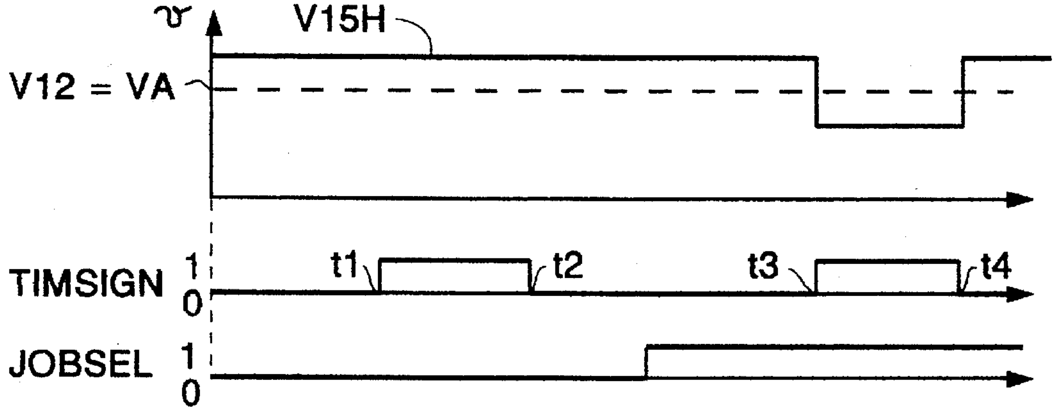
FIG. 6 is a timing diagram for a third operation mode of the sorter device.

FIG. 6 represents a timing diagram for another control mode whereby the entrainment speed of the roller 12 is the same as the forward speed of the print carrier.

In this case, the velocity of the roller 15 would be higher or lower than VA, respectively.

The lower velocity V15L is imposed here by a motor through the signals TIM SIGN and JOB SEL being jointly input to the control circuitry 29.

The signal TIM SIGN is only asserted at time intervals (such as T3–T4), when the print carrier is released from the fixing station and still engaged by the delivery rollers.

Figure 7:
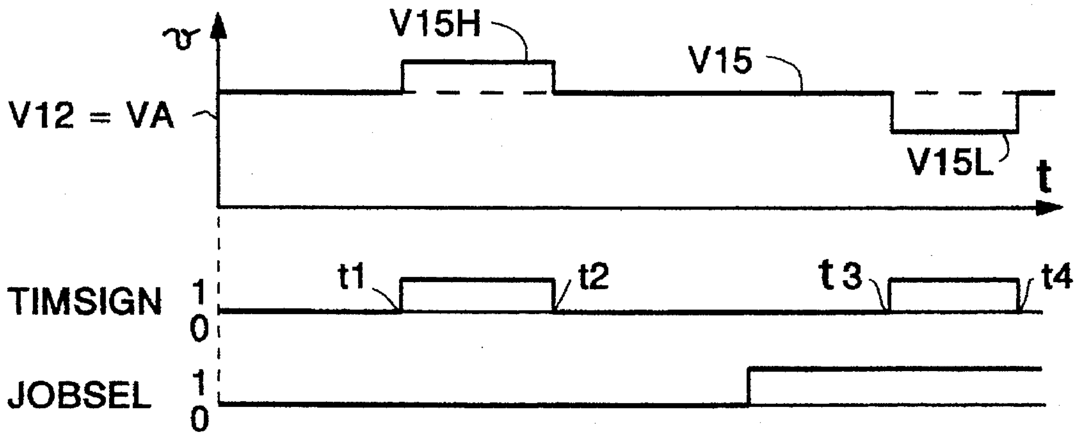
FIG. 7 is a timing diagram for a fourth operation mode of the sorter device.

Finally, FIG. 7 represents a timing diagram for a control mode suiting especially electrography apparatus with duplex or recto/verso printing facilities.

In this case, to prevent toner scratching, the rollers 12 and 15 must have peripheral velocities equal to VA while the print carrier is held within the fixing station.

Accordingly, the roller 12 is rotated at a constant peripheral velocity V12=VA.

The roller 15 is rotated at a peripheral velocity V15=VA while the print carrier is held at the fixing station.

During the time intervals such as T1–T2 or T3–T4, as defined by the signal TIM SIGN, when the print carrier is released from the fixing station, the roller 15 is rotated at a higher or lower velocity V15H than VA, depending on whether the signal JOB SEL is asserted or deasserted.

It will be appreciated that the foregoing description covers but a preferred embodiment of the invention, and that many changes may be made thereunto.

As an example, the sorter device may be controlled for different speeds to divide the print carriers into several sets, e.g. 3, 4 or more.

In particular, to divide the print carriers into three sets, the sorter device may be operated to deliver the print carriers without rotating them, resulting in their being delivered to a central location in the collecting bin, or to deliver them in combination with a rotation of the carriers in either direction, which would result in their being delivered into the collecting bin with an edge close against either of the collecting bin abutment side walls. Of course, the collecting bin slope may vary within a wide range.

In particular, while the collecting bin is shown in FIGS. 1 and 2 as having a downward slope from the forward direction of the print carriers, it could extend horizontally or slope upwards, in which case the end wall 37 would be unnecessary because of the print carriers tending to gather by gravity against an abutment wall which may be provided by the body itself of the electrophotographic apparatus.

I claim:

1. An electrophotographic apparatus incorporating a sorter device, wherein a fixing station imparts a forward speed, along an outgoing path of travel in a forward direction, to a print carrier with two side bands extending along said forward direction, one side of the print carrier having an image fixed thereon, characterized in that said apparatus comprises:

first and second friction entrainment rollers adapted to be driven independently and being arranged axially along a transverse direction to said outgoing path and respectively juxtaposed to third and fourth freely rotating pressure rollers, said print carrier being conveyed to said rollers to interpose said two side bands between said first and third rollers and said second and fourth rollers, respectively, with the side having the image fixed thereon in contact with said third and fourth rollers;

a first means for imparting a first peripheral velocity to said first roller;

a second means for imparting to said second roller a second peripheral velocity different than said first peripheral velocity and selected from at least two velocities;

a control means for controlling said second means to impart to said second roller a selected one of said at least two velocities; and a print carrier collecting bin.

2. An apparatus as in claim 1, wherein said first peripheral velocity is higher than said forward speed and said second peripheral velocity is at least equal to said forward speed.

3. An apparatus as in claim 1, wherein said first peripheral velocity is equal to said forward speed and wherein said apparatus further comprises:

identification means for identifying the position of said print carrier along said outgoing path, said identification means being operatively connected to said control means to signal the exit of a print carrier from said fixing station, said control means controlling said second means to impart to said second roller a different peripheral velocity from said forward speed for a predetermined time period upon a print carrier exiting said fixing station.

4. An apparatus as in claim 1, wherein said first means comprises a first drive shaft to which said first roller is keyed, and a fixed drive ratio mechanical transmission between a first motive means of said fixing station and said first drive shaft.

5. An apparatus as claimed in claim 4, wherein said second means comprises a second drive shaft connected to a second motive means.

6. An apparatus as in claim 1, wherein said collecting bin has first and second abutment side walls for said print carriers, said side walls forming a dihedral.

7. An apparatus as in claim 6, wherein said collecting bin has a third, abutment end wall for said print carriers separated from said side walls by cutouts for side access to said bin.

8. An apparatus as in claim 7, wherein said collecting bin has a bottom wall provided with corner cutouts aligned to said cutouts.

9. A sorting device for selectively positioning in one of at least two locations a print carrier transported in a forward direction to said sorting device, said print carrier having first and second side bands extending along said first direction, said sorting device comprising:

first roller means for engaging and imparting a first forward velocity to said first side band of said print carrier;

second roller means adapted to be driven independently of said first roller means for engaging and imparting a second forward velocity, different than said first forward velocity, to said second side band of said print carrier;

control means for controlling a relative velocity difference between said first forward velocity and said second forward velocity; and a print carrier collecting bin positioned adjacent said first and second roller means and including first and second deposit areas.

10. A sorting device, as claimed in claim 9, wherein said first and second roller means each comprise friction entrainment rollers adapted to be driven independently.

11. A sorting device, as claimed in claim 10, wherein said first and second friction entrainment rollers are respectively juxtaposed to third and fourth freely rotating pressure rollers.

12. A sorting device, as claimed in claim 9, wherein said print carrier will be deposited in said first deposit area when said first forward velocity is equal to or greater than said second forward velocity, and wherein said print carrier will be deposited in said second deposit area when said first forward velocity is less than said second forward velocity.

13. A sorting device, as claimed in claim 9, wherein said first roller means comprises a first roller operatively connected to a first drive means for driving said first roller.

14. A sorting device, as claimed in claim 13, wherein said second means comprises a second roller operatively connected to a second drive means for driving said second roller.

15. A sorting device as in claim 9, wherein said collecting bin has first and second side walls for said print carrier, said side walls forming a dihedral.

16. A sorting device as in claim 15, wherein said collecting bin has a third end wall for said print carriers separated from said side walls by cutouts for side access to said bin.

17. A sorting device as in claim 16, wherein said collecting bin has a bottom wall provided with corner cutouts aligned to said cutouts.

* * * * *